July 21, 1942. J. H. SUMMEROUR 2,290,505
SAFETY SKID FOR MINE CARS
Filed Oct. 7, 1940
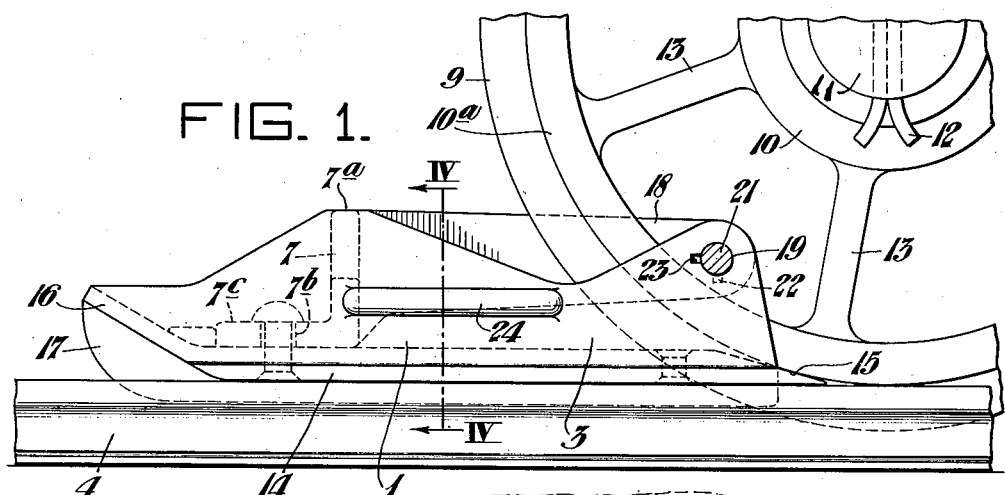
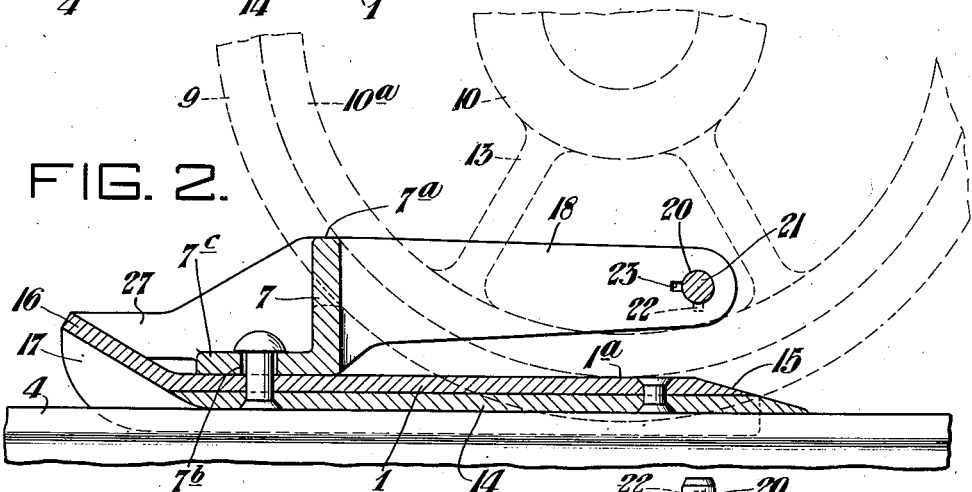
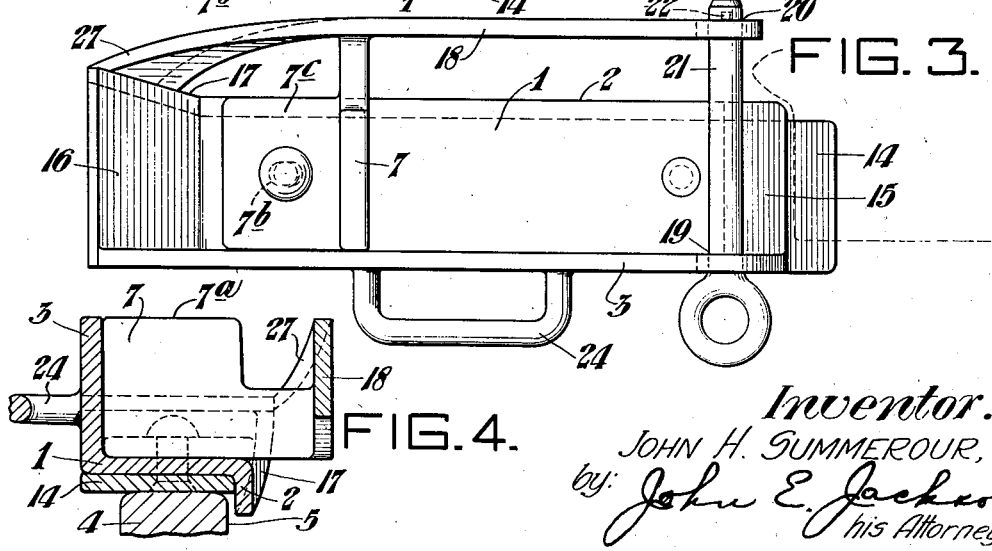
Inventor:
JOHN H. SUMMEROUR,
by: John E. Jackson
his Attorney.

Patented July 21, 1942

2,290,505

UNITED STATES PATENT OFFICE 2,290,505

SAFETY SKID FOR MINE CARS

John H. Summerour, Birmingham, Ala.

Application October 7, 1940, Serial No. 360,179

6 Claims. (Cl. 104—260)

This invention relates to a safety or braking skid of the pusher type adapted to be disposed between a traveled surface, such as a track, and a wheel, and is intended for use particularly with mine cars in which the wheels are of relatively small diameter and are freely rotatable on the axle. However, the use and application of the safety or braking skid is not limited to mine cars but may have a varied application under conditions where it is desirable to obtain a braking effect for a heavily loaded wheel on a steeply inclined grade.

It is understood, of course, that the use of skid or brake shoes for wheels of vehicles intended to travel on an ordinary roadway is old. Safety skids or brakes have also been employed for wheels on railroad tracks to prevent accidental movement of a car, such as a freight car in which both wheels are integral with the axle, down an inclined track grade. However, the difficulties involved and presented in providing satisfactory braking skids for use on a steep grade of a railroad track, or even providing the mere safety block to prevent movement of the wheels of a train upon an inclined track, are quite different and distinct from the problems involved in providing a satisfactory mine car braking skid for use on railroad tracks having a steep incline where the braking power of the locomotive alone is not sufficient to hold back the train of loaded cars and where the wheels are not rigid with the axle, but are freely rotatable thereon.

For example, in road vehicles, one type of braking skid employed has been what might be termed a "pulled" or "drawn" type, in which a U-shaped shoe is retained in functioning position with the wheel thereon, by a securing means in tension, such as a cable or chain extending from the forward end of the shoe or skid to a portion of the vehicle forward of the shoe. Such a type of shoe is unsuited for use on a railroad track as no means are provided for preventing longitudinal or lateral sliding of the brake skid upon the rail (1) during the period of movement of the wheel upon the skid, or (2) after the wheel has been positioned on the skid.

Further, in brake skid shoes of the "pull" type for vehicles the radius of the wheel is very much greater, usually by many times, than the length of the skid, so that the above cable or rope means, or some similar means, is necessary to prevent the wheel from rolling over or out of the skid, due to the greater force effective parallel to the inclined grade over the reactive tractive or frictional force between the skid and the traveled road surface. If the load on the vehicle is very great, that is, of the magnitude of loads carried by mine cars, the highway road surface would be damaged so that the brake skids or shoes would be impracticable or prohibited.

In a brake skid of the type and for the use and service as employed herein, no external tension connection by cable or otherwise between the forward end of the skid and the vehicle is employed. During the normal braking period, upon movement of the vehicle down the inclined grade, the proper normal functional relation and relative position of the brake skid and wheel are maintained by an elevated stop disposed on the skid between its ends so that the resultant forces normal and parallel to the inclined grade effective from (1) the load on the skid, (2) the traction or frictional drag of the skid, and (3) the height of the stop relative the wheel radius (which also is related to and determines a substantial length of the skid) all are related and interdependent factors which contribute to maintain normal functioning position, without the necessity for use of a cable or other tension tie member between the forward end or other part of the skid, and a part of the vehicle. A skid of this type might be termed as being of the "pusher" type as counterdistinguished from the "pull" or "drawn" type of the prior art.

One of the objects of this invention is to provide a brake for a safety skid particularly adapted for use on rails in connection with freely rotatable wheels of mining cars, where the radius of the wheel is relatively small and wherein the parts are so arranged and proportioned that no cable or the like connecting the forward end of the skid and the vehicle is necessary to hold the wheel and skid in proper relation during the functioning of the skid as a brake during movement down a steep grade.

A further object is to provide a brake skid of the pusher type in which the parts are so arranged and related relative the size of the wheel with which it is to be used that a skid of the pusher type is obtained in which a component of the load, or the forward tractive force, is normally transmitted to the skid during its travel at such an angle in opposition to the frictional tractive force between the skid and the traveled surface as to maintain the skid in operative or functional relation to the wheel without the necessity of a direct or positive locking relation between the skid and the wheel or other part of the vehicle.

A further object is to provide a braking skid of the pusher type having a loose or indirect emergency potential locking relation with the wheel, adapted to be effective upon the initial positioning of the wheel upon the skid in the event of any tendency to a relative slipping relation between the wheel and the skid, and also adapted to be effective, when the wheel is positioned upon the skid, to prevent accidental separation or displacement of the wheel and skid under conditions of abnormal load and/or grade conditions.

A further object is to provide in a braking skid of the pusher type particularly adapted for use on tracks in connection with mining cars or the like having wheels freely rotatable on their axles, skid positioning means to prevent sidewise displacement of the skid either inwardly or outwardly of the rail during its movement thereon.

A further object is to provide in a braking skid of the pusher type particularly adapted for track use on wheels of relatively small size, a stop of such a height so proportioned and disposed relative the length of the skid, and the size of the wheel, that when used in connection with a loose or indirect emergency type of locking means any tendency of the skid to leave the rail or become otherwise displaced relative to the wheel is minimized.

In accordance with the present invention a skid is provided having means for effecting a preliminary indirect or loosely locked relation between the car wheel which preferably has a small radius relative to the length of the skid so that a loose or potentially effective emergency locking relation is effected between the wheel and the skid even before the wheel moves upon the base of the skid, the locking relation being of such a character that it prevents relative slipping or sliding of the skid in front of the wheel when an attempt is made to run the wheel upon the skid, and also serves as a locking means to maintain the wheel and skid in proper position and to prevent accidental separation or displacement under abnormal conditions of load, grade or tractive force during the period of movement of the skid upon the inclined rail surface.

One preferred form of the invention is shown for purposes of illustration in the accompanying drawing and is described in the following description. As above indicated, this is for the purposes of illustration and not for limitation, as it would be apparent that certain features may be widely varied without departing in essential respects from the present invention.

Figure 1 is a side elevation of the skid and a spoked wheel, showing the relative positioning thereof as the wheel is about to be rolled upon the skid showing the parts in proper relative position to permit what might be termed a potential tentative anti-slip-loose locking relation to be established between the skid and the wheel.

Figure 2 is a longitudinal section showing the wheel in dotted lines in position upon the skid with the car wheel tread engaging the upper edge of the stop.

Figure 3 is a top plan of the skid showing the locking pin in position.

Figure 4 is a transverse section looking in the direction of the arrow and taken on the line IV—IV of Figure 1.

As shown in the drawing, the skid body includes essentially a base 1 adapted to lie upon the upper tread receiving face of the track or rail 4. As shown, the base is of elongated rectangular form, the length of the base being determined in the design thereof by its relation to a number of other factors, such as the maximum load, the radius of the wheel, the location and height of a stop (hereinafter to be more fully referred to), the maximum and minimum grade on which the skid is likely to be used, and the friction or tractional drag between the skid and the rail surface under various conditions and use.

Means are provided to prevent sidewise displacement in either direction, that is, either inwardly or outwardly of the rail. As shown, a downwardly extending flange 2 is provided to restrain the skid from sliding outwardly of the rail. This flange extends longitudinally of the base 1 and lies adjacent the inner face 5 of the rail head. As a means of restraining the skid body against sliding inwardly of the rails, an upwardly extending flange 3 on the opposite side of the base 1 is provided, said flange extending longitudinally of the base and upwardly so as to lie adjacent the outer face of the wheel tread. The extent to which the rear portion of the outer flange extends above the base will hereinafter be more fully considered in connection with the disposition and arrangement of the potential locking means hereinafter referred to.

A raised stop 7 is provided on the skid base intermediate the ends thereof. As shown, the stop comprises an L-shaped member secured to the base by any suitable means, such as rivet bolts or the like. It is understood, of course, that if desired said stop may also be welded in position or formed as an integral part of the skid body. One of the advantages in providing the stop as a separate member which may be detachably secured to the skid is that such part may be replaced by stops of the same or different heights, if desired, and the skid adapted to wheels of varying sizes, within limits. The inner end of the upstanding stop is provided with a cut away slot portion to receive the flange 9 of the wheel 10 when the tread 10$^a$ of the wheel engages or rests against the upper edge 7$^a$ of the stop 7. The height of the stop 7, which determines the point at which the upper edge of the stop engages the tread of the wheel, bears an important relation to a number of factors such, for example, as the wheel radius and the distance from the point 1$^a$ at which the wheel rests upon the skid base 1 and stop 7, which length in turn determines the arc or extent of a chord thereof extending between the point 1$^a$ of wheel contact with the base of the skid and the point 7$^a$ of contact of the wheel tread with the upper edge of the stop. These relations relative to the various loading conditions, and the steepness of the grade, are all factors entering into and determining the successful functioning of the skid as a pusher type, as distinguished from other skids of the prior art which might be termed puller or drawn type of skid.

In referring to the character of the grade as being steep, it is understood that grades which are shallower, or lower grades, which might be encountered approaching a level grade from the steeper grades, are also to be taken into consideration in dealing with the forces effective upon and between the loaded wheel on the skid. Specifically, the gravity component of the load effective to increase the frictional traction between the lower face of the skid and the upper tread face of the rail will be greater upon the level and lower inclined grades than upon the steeper grades. This condition might be termed one of the optimum conditions under which the skids will be required to function. The height of the stop relative the radius of the wheel, under this latter condition, should be such as to normally prevent any tendency of the wheel to separate from the skid if the drawing or pulling force of the locomotive is sufficient to cause movement of the load along a portion of the level grade.

The base 1 is of a length such that the leading end thereof in contact with the rail is forward of the stop 7. In practice it has been found satisfactory to extend the base forward to a point approximating a point on a radial line extending from the center of the wheel through the point 7a at the upper edge of the stop which engages the tread face of the wheel. However, the exact location of the leading edge of the base may be varied considerably within limits without essentially departing from this invention. In referring above to the portion of the base forward of the stop, reference is made to a portion of the base lying parallel with the rail as distinguished between an upwardly inclined portion 16 which forms a leading bevel edge adapted to guide the skid in its movement over any irregularities in the rail joints.

Preferably, the downwardly extending flange portion 2 is continued forward and upward to the underside of the upwardly inclined leading tip portion 16 of the base to form a tip side guide 17. The flange portion so disposed would tend to prevent any tendency of the skid to sidewise slippage from the rail, in the event that conditions and the load were such as to cause a slight tilting of the skid about the forward end of the base at the point of mergence with the upwardly inclined portion, as a fulcrum or pivot point.

A side arm 18 extends rearwardly from the inner end of the stop adjacent the flange side of the wheel, the lower portion of this side arm being spaced from the inner longitudinally extending edge of the base in order to avoid interference with the wheel flange 9. In the end of this arm 18 is provided an aperture 20 to receive the end of a locking pin 21 which may be passed through a preferably slotted aperture 19 located in the rear upper portion of the outer flange 3. Preferably the end of the locking pin 21 is provided with a projecting boss 22 adapted to pass through apertures 23 communicating with the aperture 20 which receives the inner end of the locking pin 21. Such an arrangement serves to lock the pin in position and prevent accidental withdrawal. It is of course understood that the structure and arrangement of the locking means extending between the inner arm and the outer flange may be varied to meet different conditions. In the original layout and design it is considered a feature of importance to have the potential locking means, in this instance as illustrated, the locking pin and the apertures for receiving the same located at a point approximating the rear end of the base and at a sufficient distance above the base so as to lie above the inner face of the wheel rim when the wheel is brought to a position such, for example, as when it is about to be rolled upon the rearwardly inclined beveled end portion 15 of the base. The pin 21 should be spaced from the inner face of the wheel rim 10a a sufficient distance to allow movement of the wheel tread upward and forward on the base 1 of the skid until the wheel tread engages the upper edge 7a of the stop, all without having the movement of the wheel interfered with or intercepted by the locking pin 21.

It might be stated that there is one apparent exception to the above statement, which exception might exist under the following conditions. Where the skid is placed on the track under the wheel, preparatory to the positioning of the wheel upon the skid, if there be any tendency for the skid to slide upon the rail as the wheel is rotated, the position and height of the locking pin above the inner face of the wheel rim and the spoke should be such that if the relative slipping relation between the skid and the wheel is sufficient to permit a spoke 13 of the wheel 10 to engage the locking pin 21 or the like, further slipping relation between the wheel and the skid is prevented so that the wheel 10 rolls up the inclined edge 15 and upon the base 1 of the skid until the wheel rests upon the skid at a point such as 1a which is just forward of the beveled rear end of the base. The locking pin 21 should be disposed at a sufficient height to avoid any interference with the inner face of the wheel rim during the rolling of the wheel upon the skid. During this latter period there will be relative movement between the pin 21 and the wheel 10 and its parts.

Under normal conditions, when the wheel is mounted or rolled upon the base of the skid there should normally be no slipping relation after the rearwardly beveled end 15 of the skid is placed on the rail and moved to a position between the wheel tread 10a and the rail 4. In bringing the skid to such a position it is preferable that caution be taken in observing that the spokes of the wheel are in proper relation to the length of the skid from its rear end 15 forward to the stop 7 and the position of the locking pin 21 in order to permit rolling of the wheel 10 upon the skid base 1 without any interference between the pin 21 after it has been inserted in position and either the inner face of the wheel rim 10a or the next spoke in the wheel toward the rear of the skid. Figure 1 shows the relative position of the wheel 10 and the skid having the locking pin 21 therein with the skid placed in position on the rail just before the wheel is rolled upon the skid base 1. Figure 2 shows the relative position of the various parts after the wheel has been rolled upon the skid and its further movement intercepted by the upper edge 7a of the stop 7. It is apparent from the latter view that there has been no interference of the locking pin 21 with the inner edge of the wheel rim 10a, the spoke 13 or other parts of the wheel. Also in this latter position the locking pin 21 is still shown at a position spaced from the inner edge of the wheel and the spoke but is so located as to form a locking relation between the skid and the wheel and to thus prevent separation of these parts, in the event of conditions being such as to cause any tendency of the wheel to ride upward upon or over the upper edge 7a of the stop. If such a condition should arise, the pin 21 would be brought into engagement with the inner face of the wheel rim 10a and continued forward movement of the wheel would tend to tilt the wheel skid about the forward point of the base 1 which would serve as a pivot point forming an extended point of leverage which would tend to resist further movement of the loaded wheel or further tilting of the skid upon the rail. There might, under such conditions, be a tendency for the loaded wheel and the skid to slide forward by a sliding engagement between the forward end of the skid base and the rail. It is believed that this is a new feature in the construction and operation of skids of the pusher type, particularly the feature of translating the normally ineffective potential locking capability into a direct positive locking relation of skid and wheel upon tilting tendency of the skid about the forwardly extended leading tip of the skid.

In order to provide a strengthening feature for the upstanding stop 7, particularly when formed integral with the skid, and as forming a portion which houses the wheel flange, an upwardly extending side wall portion 27 extends forward from the inner end of the stop and merges with the portion of the base which extends forward of the stop 7 and also with the upwardly inclined base portion 16.

When the stop 7 is formed as a separable member, it is preferably formed as an L-shaped member, as indicated in Figures 2 and 3 and is of sufficient strength to withstand any normal force effective by its engagement at its upper edge 7a with the tread of the wheel. If desired, such a detachable L-shaped stop portion might be made adjustable upon the base of the skid by providing a suitable slot connection 7b in the horizontally disposed base portion 7c of the L-shaped stop member. A suitable nut and bolt connection would permit ready longitudinal adjustment of the stop 7 upon the base 1 and would readily adapt the use of the skid to wheels of various sizes within the limits of the adjustability of the stop 7 on the base 1 as found desirable. Of course, in ordinary railroad use where a wheel of given or constant size is employed, the adjustable feature would not be employed.

In the use of the skid of the type herein referred to, in connection with its use with mine cars, such conditions of use are distinguishable from use in connection with freight car wheels, the basis of distinction being the difference in manner of mounting of the wheel upon the axle. In the mine cars the wheel 10 is usually loosely mounted upon the axle 11 so as to be freely rotatable thereon, the wheel being secured in position by a cotter pin 12 or in any other suitable manner well known to those skilled in the art. In freight cars, the wheels on opposite ends of the axle are usually rigidly secured thereon so that relative rotation of the wheel upon the axle is precluded. This distinction has an important bearing upon the use of the skid in connection with the freely rotatable wheels in mine cars because, in the latter instance of use on the integrally mounted wheel, when the wheel is positioned on the skid there is torsional force transmitted through the shaft to the wheel integral thereon tending to rotate the wheel on the skid due to frictional engagement of the wheel on the opposite end of the shaft being in engagement with the other rail, such as would be the case in a freight car or other vehicle where the wheels on opposite ends of the axle are rigidly mounted.

In order to facilitate handling of the skid, a handle 24 may be provided which may be located at any suitable point. As shown, the handle is located on the outer side of the upstanding flange 3.

If desired, a separate wearing plate 14 is preferably adapted to be removably secured in any suitable manner to the lower face of the skid base 1. Of course, when such a plate is used, the forward and rearward ends of the plate would be beveled to correspond with the leading and rear beveled portions of the base. Conditions of use might make it desirable to provide the upwardly beveled tip 16 with means providing a different coefficient of friction, either lower or higher, than that of the wearing shoe 14 with the rail 4.

While one preferred form of skid has been shown and described for purposes of illustration, it is apparent that certain features of the same may be widely varied without departing essentially from other characterizing and essential features and relation of parts comprising the invention as defined in the following claims.

I claim:

1. A safety braking skid of the pusher type adapted to be interposed between a rail and wheel and loosely locked against accidental displacement prior to positioning of the wheel on the skid, said skid comprising a base adapted to lie on the rail, means to prevent displacement in one direction laterally of the rail including a downwardly extending flange adapted to lie adjacent the rail head, means to prevent lateral displacement in the other direction including an upwardly extending side flange adjacent the outer face of the wheel, an elevated stop on the base intermediate its ends to limit the movement of the wheel relative to the skid, and detachable locking means disposed about the wheel rim and having a potential positive locking capability to prevent accidental separation of the skid body relative the wheel either during the period when the wheel is being moved upon the skid or after the wheel is positioned on the skid, said locking means including a locking pin caried by one side of the skid body and arranged and disposed to extend through the wheel and above the wheel rim a sufficient distance so that when the skid has been initially placed in position and before the wheel has been moved upon the skid brake base, the wheel may be moved into position upon the skid base without interference with the locking means.

2. A safety braking skid of the pusher type adapted to be interposed between a rail and wheel, said skid comprising a base having a length greater than the radius of the wheel with which it is to be used and adapted to lie on the rail, means to prevent lateral displacement in one direction outside of the rail including a downwardly extending flange lying adjacent the inner edge of the rail, means to prevent lateral displacement in the other direction inward of the rails including an upwardly extending side flange on the opposite side of the base and adapted to lie adjacent the outer face of the wheel, an inclined edge at one end of the base to facilitate the initial mounting of the wheel on the base, an elevated stop on the base intermediate its ends to limit the initial movement of the wheel relative to the skid and of a height to retain the loaded wheel in position on the skid during the movement of the skid on the rail, an upwardly tapered leading edge for the base to clear any unevenness in the rail joints, and a replaceable wearing plate flat throughout secured to the lower face of the base.

3. A safety braking skid of the pusher type adapted to be interposed between a rail and wheel, said skid comprising a base adapted to lie on the rail, means to prevent displacement laterally of the rail including a downwardly extending flange, means to prevent lateral displacement in the other direction including an upwardly extending side flange on the opposite side of the base adapted to lie adjacent the outer face of the wheel, an elevated stop on the base intermediate its ends to limit the movement of the wheel relative to the skid, said stop having a recess to receive the inner flange of the car wheel, an arm extending rearwardly from said stop and spaced from the base and positioned to lie adjacent the inner face of the wheel, and detachable locking means disposed about the wheel rim to prevent accidental displacement of the skid body relative the wheel either during the period when the wheel is being moved upon the skid or after the wheel is positioned on the skid brake, said locking means including a locking pin supported at one end by one side of the skid body and arranged and disposed to extend through the wheel and above the wheel rim a sufficient distance so that when the skid has been initially placed in position and before the wheel has been moved upon the skid brake base, the wheel may be moved into position upon the skid base without interference with the locking means, the other end of said pin being supported in the arm extending rearwardly from said stop.

4. A safety braking skid of the pusher type adapted to be interposed between a traveled surface and a wheel and locked against accidental displacement relative the wheel prior to positioning of the wheel on the skid, said skid comprising a base adapted to lie on the traveled surface, means to prevent lateral displacement including an upwardly extending side flange adjacent the outer face of the wheel, an inclined leading edge at one end of the base to facilitate positioning of the wheel on the base, an elevated stop on the base intermediate its ends to limit the movement of the wheel relative to the skid, an upwardly tapered leading edge for the base to clear any unevenness in the traveled surface, a replaceable wearing plate secured to the lower face of the base, an arm extending rearwardly from said stop and spaced from the base and positioned to lie adjacent the inner face of the wheel, and detachable locking means disposed about the wheel rim to prevent accidental displacement of the skid body relative the wheel either during the period when the wheel is being moved upon the skid or after the wheel is positioned on the skid brake, a locking pin supported at one end by one side of the skid body and arranged and disposed to extend through the wheel and above the wheel rim a sufficient distance so that when the skid has been initially placed in position and before the wheel has been moved upon the skid brake base, the wheel may be moved into position upon the skid base without interference with the locking means, the other end of said pin being supported in the arm extending rearwardly from said stop.

5. A safety braking skid of the pusher type adapted to be interposed between a rail and wheel, said skid comprising a base having a length greater than the radius of the wheel with which it is to be used and adapted to lie on the rail, means to prevent lateral displacement in one direction outside of the rail including a downwardly extending flange lying adjacent the inner edge of the rail, means to prevent lateral displacement in the other direction inward of the rails including an upwardly extending side flange on the opposite side of the base and adapted to lie adjacent the outer face of the wheel, an inclined edge at one end of the base to facilitate the initial mounting of the wheel on the base, an elevated stop on the base intermediate its ends to limit the initial movement of the wheel relative to the skid and of a height to retain the loaded wheel in position on the skid during the movement of the skid on the rail, and an upwardly tapered leading edge for the base to clear any unevenness in the rail joints.

6. In a braking skid adapted for use on wheels having a radius approximating the length of the skid, said skid comprising a base adapted to slide on a traveled surface, the overall length of said base being greater than the radius of the wheel with which it is to be used, an elevated wheel stop removably fixed on said base between the ends thereof and adapted to engage the circumferential wheel tread thereon, said stop being located at a distance from the point where the wheel rests upon the base of the skid greater than one-half but less than the radius of the wheel, whereby the two points of contact of the skid with the wheel subtends an angle of more than 45 degrees, the forward end of said skid being upwardly inclined, the point of intersection of said upwardly inclined end and the skid base in sliding engagement with the surface being at a distance approximating the wheel radius from the rear end of the skid, and potential locking means capable of effecting a positive locking relation in emergency between the skid and wheel arranged to permit limited sliding relation therebetween but to prevent separation thereof.

JOHN H. SUMMEROUR.